United States Patent
Ihm (10) Patent No.: US 6,598,716 B1
(45) Date of Patent: Jul. 29, 2003

(54) ROTOR FOR A VEHICLE BRAKE ASSEMBLY AND METHOD FOR PRODUCING SAME

(75) Inventor: Mark Ihm, Farmington, MI (US)

(73) Assignee: Kelsey-Hayes Company, Livonia, MI (US)

(*) Notice: Subject to any disclaimer, the term of this patent is extended or adjusted under 35 U.S.C. 154(b) by 0 days.

(21) Appl. No.: 10/059,787

(22) Filed: Jan. 29, 2002

(51) Int. Cl.⁷ .............................................. B22D 15/00
(52) U.S. Cl. ................................. 188/218 XL; 29/527.6
(58) Field of Search .............................. 29/434, 527.6; 188/218 A, 218 R, 218 XL (56) References Cited

U.S. PATENT DOCUMENTS

| | | | | |
|---|---|---|---|---|
| 5,430,926 A | * | 7/1995 | Hartford | 29/434 |
| 5,664,648 A | * | 9/1997 | Hester | 188/218 R |
| 5,915,747 A | * | 6/1999 | Dickerson et al. | 29/527.6 |
| 6,112,398 A | * | 9/2000 | Messina | 29/527.6 |
| 6,241,055 B1 | * | 6/2001 | Daudi | 188/73.35 |

* cited by examiner

Primary Examiner—Christopher P. Schwartz
(74) Attorney, Agent, or Firm—MacMillan, Sobanski & Todd, LLC (57) ABSTRACT

A brake rotor adapted for use in a vehicle brake system includes a brake rotor formed by a casting process. The brake rotor includes an inner mounting flange and an outer friction disc. The inner mounting flange includes an inner surface, an outer surface, and a center pilot hole formed therethrough. The outer friction disc includes an inner friction plate and an outer friction plate. The inner friction plate has an outer facing surface, an outer peripheral edge and an inner peripheral edge. The outer friction plate has an outer facing surface and an outer peripheral edge. The outer friction plate is connected to the inner mounting flange by a hat, and the hat has an outer facing surface and an inner facing surface. The inner mounting flange of the brake rotor includes a plurality of lug bolt receiving holes formed therethrough which are formed during the casting process.

21 Claims, 7 Drawing Sheets

ROTOR FOR A VEHICLE BRAKE ASSEMBLY AND METHOD FOR PRODUCING SAME

BACKGROUND OF THE INVENTION

This invention relates in general to vehicle brake assemblies and in particular to a brake rotor adapted for use in such a vehicle brake assembly and to a method for producing such a brake rotor.

Most vehicles are equipped with a brake system for slowing or stopping movement of the vehicle in a controlled manner. A typical brake system for an automobile or light truck includes a disc brake assembly for each of the front wheels and either a drum brake assembly or a disc brake assembly for each of the rear wheels. The brake assemblies are actuated by hydraulic or pneumatic pressure generated when an operator of the vehicle depresses a brake pedal. The structures of these drum brake assemblies and disc brake assemblies, as well as the actuators therefor, are well known in the art.

A typical disc brake assembly includes a rotor which is secured to the wheel of the vehicle for rotation therewith. A caliper assembly is slidably supported by pins secured to an anchor bracket. The anchor bracket is secured to a non-rotatable component of the vehicle, such as the vehicle frame. The caliper assembly includes a pair of brake shoes which are disposed on opposite sides of the rotor. The brake shoes are operatively connected to one or more hydraulically actuated pistons for movement between a non-braking position, wherein they are spaced apart from opposed axial sides or braking surfaces of the rotor, and a braking position, wherein they are moved into frictional engagement with the opposed braking surfaces of the rotor. When the operator of the vehicle depresses the brake pedal, the piston urges the brake shoes from the non-braking position to the braking position so as to frictionally engage the opposed braking surfaces of the rotor and thereby slow or stop the rotation of the associated wheel of the vehicle.

A typical disc brake rotor is formed from grey cast iron during a sand mold casting process. The rotor includes a generally hat-shaped body, and an outer annular section which are integrally cast as one-piece during the casting process. This kind of rotor is commonly referred to as a "full cast" rotor. In some instances, the rotor is formed with an integrally cast hub, and is referred to as a "uni-cast" rotor.

In the above rotor constructions, the hat-shaped body includes a mounting surface having a centrally locating pilot hole formed therein during the casting process, and a plurality of lug bolt receiving apertures equally spaced circumferentially about the pilot hole. The lug bolt receiving apertures are formed during a subsequent drilling operation.

The outer annular section of the rotor includes two parallel outer surfaces which define a pair of brake friction surfaces. The brake friction surfaces can be cast as a single solid brake friction plate, or can be cast as a pair of brake friction plates disposed in a mutually spaced apart relationship by a plurality of ribs or fins to produce a "vented" rotor. The brake friction surfaces, as well as other selected surfaces of the rotor including the lug bolt receiving apertures, are typically machined by two "rough" finishing operations followed by a single "finish" machining operation. The two rough finishing operations require two separate chucking operations.

SUMMARY OF THE INVENTION

This invention relates to a brake rotor adapted for use in a vehicle brake system and a method for producing such a brake rotor. The brake rotor includes an inner mounting flange and an outer friction disc. The inner mounting flange includes an inner surface, an outer surface, and a center pilot hole formed therethrough. The outer friction disc includes an inner friction plate and an outer friction plate. The inner friction plate has an outer facing surface, an outer peripheral edge and an inner peripheral edge. The outer friction plate has an outer facing surface and an outer peripheral edge. The outer friction plate is connected to the inner mounting flange by a hat, and the hat has an outer facing surface and an inner facing surface. The inner mounting flange of the brake rotor includes a plurality of lug bolt receiving holes formed therethrough which are formed during the casting process. The method for producing the brake rotor comprises the steps of: (a) providing a mold; (b) casting a brake rotor in the mold, the brake rotor including an inner mounting flange and an outer friction disc, the inner mounting flange having a plurality of as cast lug bolt receiving holes formed therethrough; (c) removing the brake rotor from the mold; (d) performing at least one rough machining operation on the brake rotor; and (e) performing at least one finish machining operation on the brake rotor to thereby produce a finish machined brake rotor.

Other advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
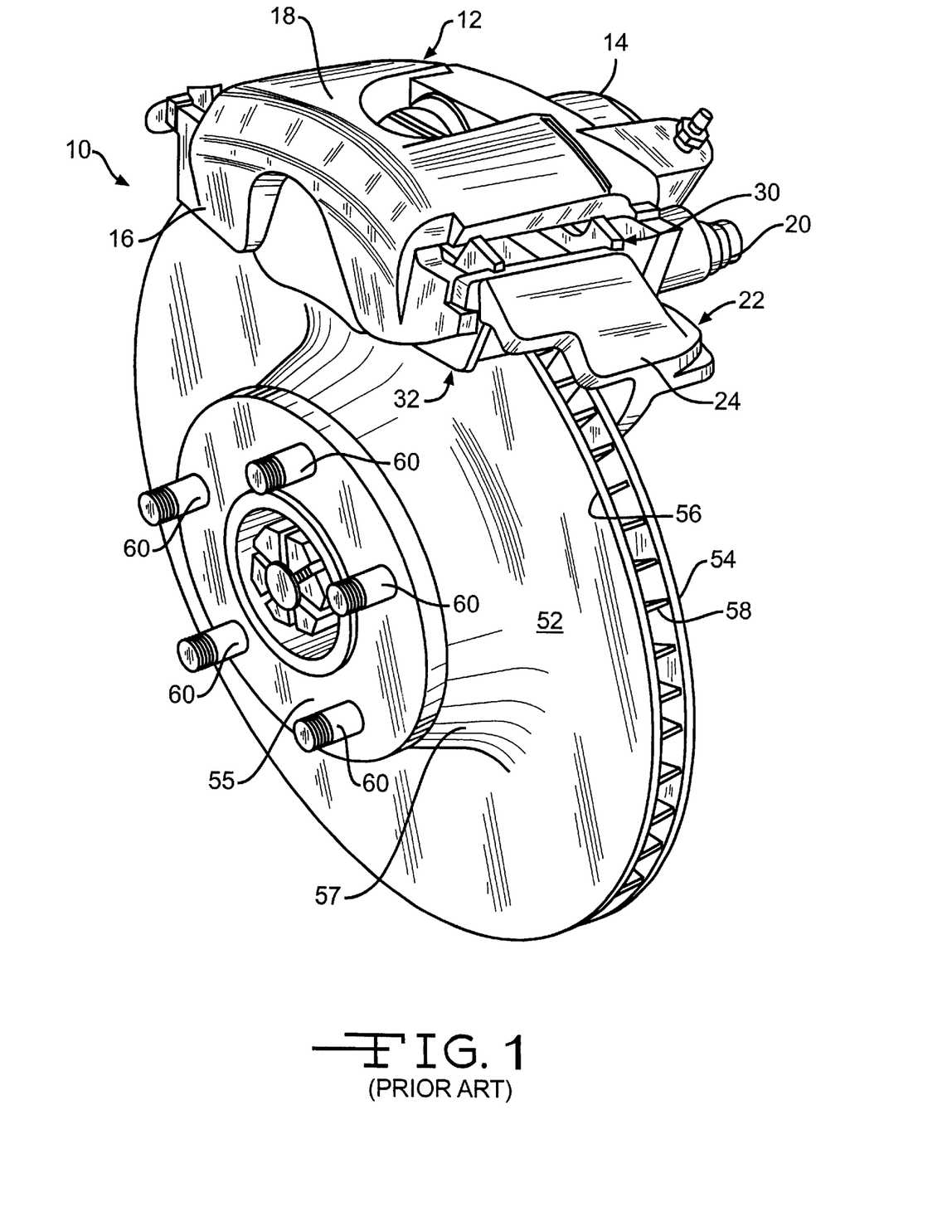
FIG. 1 is a perspective view of a portion of a prior art vehicle disc brake assembly.
Figure 2:
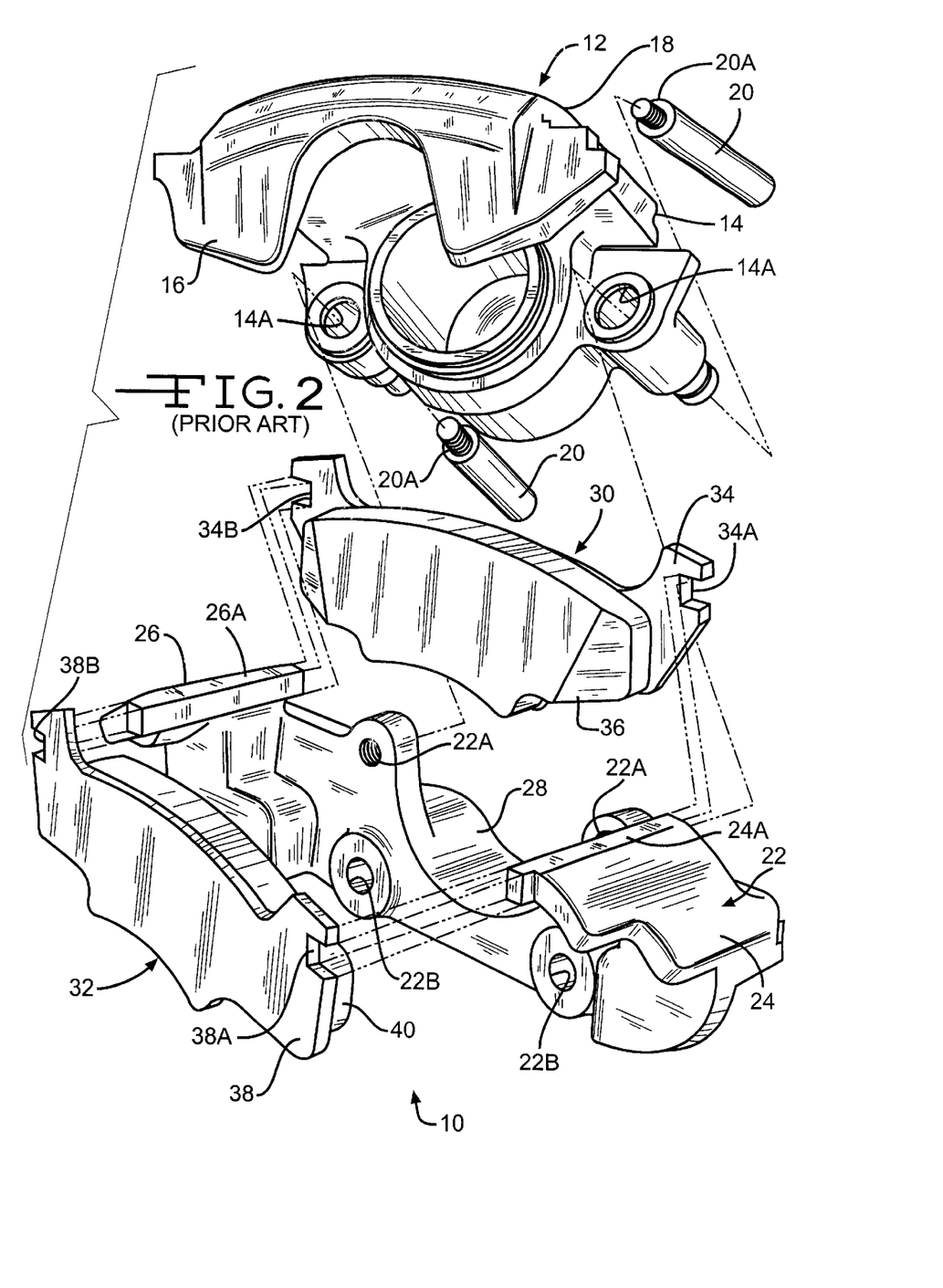
FIG. 2 is an exploded perspective view of selected components of the prior art vehicle disc brake assembly illustrated in FIG. 1.
Figure 3:
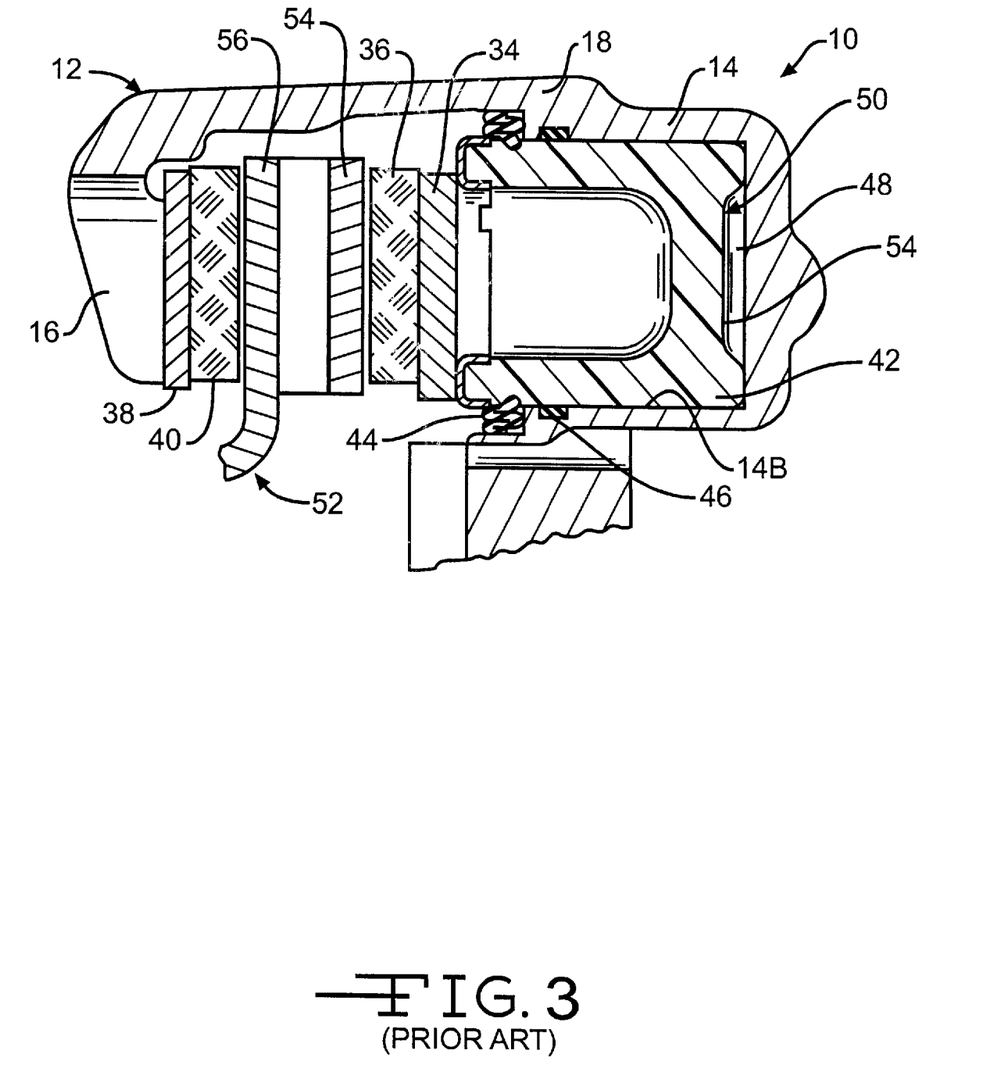
FIG. 3 is a sectional elevational view of a portion of the prior art disc brake assembly illustrated in FIG. 1.

Referring now to the drawings, there is illustrated in prior art FIGS. 1 through 3 a portion of a prior art vehicle disc brake assembly, indicated generally at 10. The general structure and operation of the disc brake assembly 10 is conventional in the art. Thus, only those portions of the disc brake assembly 10 which are necessary for a full understanding of this invention will be explained and illustrated.

The prior art disc brake assembly 10 is a sliding type of disc brake assembly and includes a generally C-shaped caliper, indicated generally at 12. The caliper 12 includes an inboard leg portion 14 and an outboard leg portion 16 which are interconnected by an intermediate bridge portion 18. The caliper 12 is slidably supported on a pair of pins 20 secured to an anchor bracket, indicated generally at 22. The anchor bracket 22 is, in turn, secured to a stationary component of the vehicle. Such a stationary component can be, for example, an axle flange (not shown), when the disc brake assembly 10 is installed for use on the rear of the vehicle, or a steering knuckle (not shown), when the disc brake assembly 10 is installed for use on the front of the vehicle.

The pins 20 extend through non-threaded apertures 14A formed in the inboard leg 14 of the caliper 12. The pins 20 have respective threaded ends 20A which are received in threaded apertures 22A provided in anchor bracket 22. The pins 20 support the caliper 12 for sliding movement relative to the anchor bracket 22 in both the outboard direction (left when viewing prior art FIG. 3) and the inboard direction (right when viewing prior art FIG. 3). Such sliding movement of the caliper 12 occurs when the disc brake assembly 10 is actuated, as will be explained below. A pair of bolts (not shown) extend through a pair of non-threaded apertures 22B formed in the anchor bracket 22 to secure the anchor bracket 22 to the stationary vehicle component. Alternatively, other known securing methods can be used to secure the anchor bracket 22 to the stationary vehicle component and/or the caliper 12 to the anchor bracket 22.

As best shown in prior art FIG. 2, the anchor bracket 22 includes a pair of axially and outwardly extending arms 24 and 26 which are interconnected at their inboard ends by an inner tie bar 28. The arms 24 and 26 have upstanding guide rails 24A and 26A, respectively formed thereon. The guide rails 24A and 26A extend transverse to the arms 24 and 26, respectively, and parallel to one another. The guide rails 24A and 26A slidably support an inboard brake shoe, indicated generally at 30, and an outboard brake shoe, indicated generally at 32, respectively.

The inboard brake shoe 30 includes a backing plate 34 and a friction pad 36. The inboard backing plate 34 includes opposed ends having notches 34A and 34B formed therein, for supporting the inboard brake shoe 30 on the guide rails 24A and 26A of the anchor bracket 22. The outboard brake shoe 32 includes a backing plate 38 and a friction pad 40. The outboard backing plate 38 includes opposed ends having notches 38A and 38B formed therein, for supporting the outboard brake shoe 32 on the guide rails 24A and 26A of the anchor bracket 22. Alternatively, the inboard brake shoe 30 can be supported on a brake piston of the prior art disc brake assembly 10, while the outboard brake shoe 32 can be supported on the outboard leg portion 16 of the caliper 12.

An actuation means, indicated generally at 50 in prior art FIG. 3, is provided for effecting the operation of the disc brake assembly 10. The actuation means 50 includes a brake piston 42 which is disposed in a counterbore or recess 14B formed in the outboard surface of the inboard leg 14 of the caliper 12. The actuation means 50, shown in this embodiment as being a hydraulic actuation means, is operable to move the piston 42 within the recess 14B in the outboard direction (left when viewing prior art FIG. 3). However, other types of actuation means 50, such as for example, electrical, pneumatic, and mechanical types, can be used.

The prior art disc brake assembly 10 also includes a dust boot seal 44 and an annular fluid seal 46. The dust boot seal 44 is formed from a flexible material and has a first end which engages an outboard end of the recess 14B. A second end of the dust boot seal 44 engages an annular groove formed in an outer side wall of the piston 42. A plurality of flexible convolutions are provided in the dust boot seal 44 between the first and second ends thereof. The dust boot seal 44 is provided to prevent water, dirt, and other contaminants from entering into the recess 14B. The fluid seal 46 is disposed in an annular groove formed in a side wall of the recess 14B and engages the outer side wall of the piston 42. The fluid seal 46 is provided to define a sealed hydraulic actuator chamber 48, within which the piston 42 is disposed for sliding movement. Also, the fluid seal 46 is designed to function as a "roll back" seal to retract the piston 42 within the recess 14B (right when viewing prior art FIG. 3) when the brake pedal is released.

The prior art disc brake assembly 10 further includes a brake rotor 52, which is connected to a wheel (not shown) of the vehicle for rotation therewith via a hub (not shown). The illustrated brake rotor 52 includes a pair of opposed friction discs 54 and 56 which are spaced apart from one another by a plurality of intermediate fins or posts 58 in a known manner. The brake rotor 52 extends radially outwardly between the inboard friction pad 36 and the outboard friction pad 40. The brake rotor 52 further includes a mounting flange 55 and a hat section 57.

Figure 10:
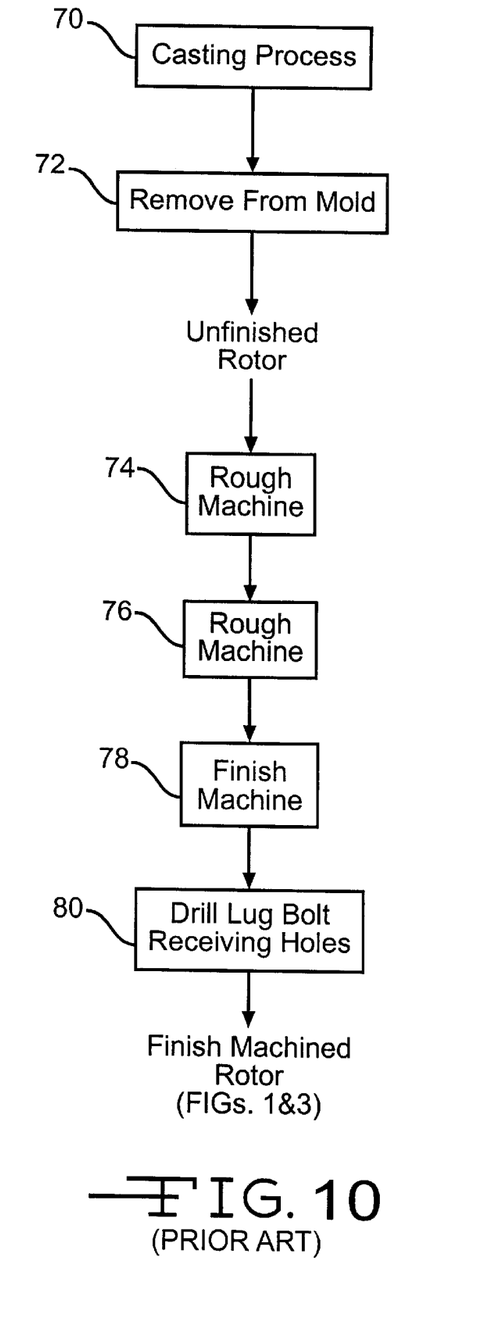
FIG. 10 is a block diagram showing a sequence of steps for producing the prior art rotor illustrated in FIGS. 1–3.

As shown in prior art FIG. 10, the prior art brake rotor 52 is produced by the following prior art method. In step 70, the brake rotor is cast in a mold by a known green sand mold casting process. The "unfinished" cast brake rotor is removed from the mold in step 72 and is rough machined in step 74. In particular, during step 74, the outer and inner surfaces of the hat section, the outer surfaces of the friction discs 54 and 56, the inner and outer surfaces of the mounting flange are rough machined and the center hub hole is turned. Next, in step 76, the outer peripheral edges of the friction plates 54 and 56 and the inner peripheral edge of the friction plate 54 are rough machined. Following this, in step 78, the inner and outer surfaces of the mounting flange and the outer surfaces of the friction plates are finish machined. After this, in step 80 the lug bolt receiving holes are formed in the mounting flange by a drilling operation to produce the finish machined prior art brake rotor 52, shown in prior art FIGS. 1 and 3.

When it is desired to actuate the prior art disc brake assembly 10 to retard or stop the rotation of the brake rotor 52 and the vehicle wheel associated therewith, the driver of the vehicle depresses the brake pedal (not shown). In a manner which is well known in the art, the depression of the brake pedal causes pressurized hydraulic fluid to be introduced into the chamber 48. Such pressurized hydraulic fluid urges the piston 42 in the outboard direction (toward the left when viewing prior art FIG. 3) into engagement with the backing plate 34 of the inboard brake shoe 30. As a result, the friction pad 36 of the inboard brake shoe 30 is moved into frictional engagement with the inboard friction disc 54 of the brake rotor 52. At the same time, the caliper 12 slides on the pins 20 in the inboard direction (toward the right when viewing prior art FIG. 3) such that the outboard leg 16 thereof moves the friction pad 40 of the outboard brake shoe 32 into frictional engagement with the outboard friction disc 56 of the brake rotor 52. As a result, the opposed friction discs 54 and 56 of the brake rotor 52 are frictionally engaged by the respective friction pads 36 and 40 to slow or stop relative rotational movement thereof. The structure and operation of the prior art disc brake assembly 10 thus far described is conventional in the art.

Figure 4:
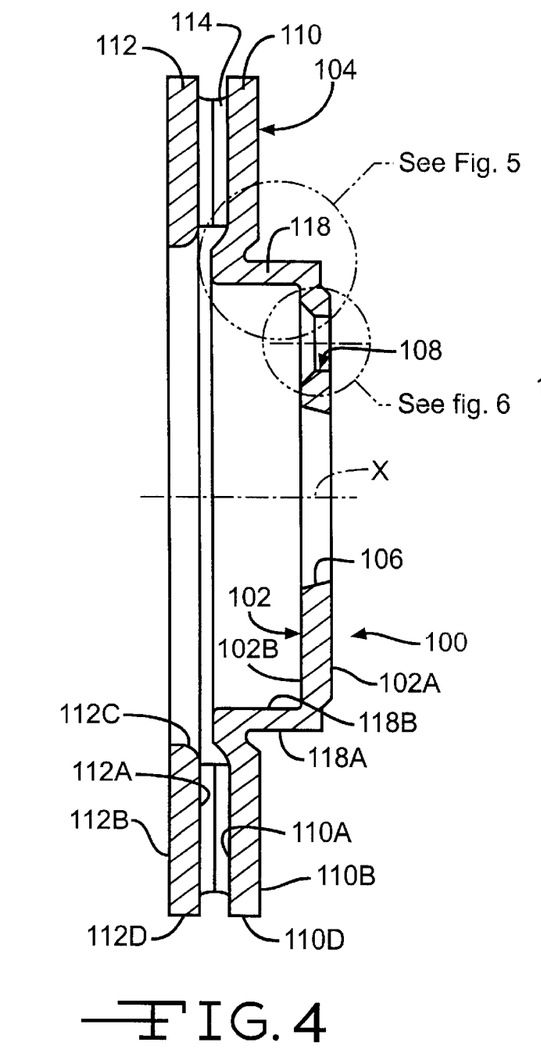
FIG. 4 is a sectional view of an as cast rotor adapted for use in the prior art disc brake assembly illustrated in FIGS. 1–3, in accordance with the present invention.
Figure 5:
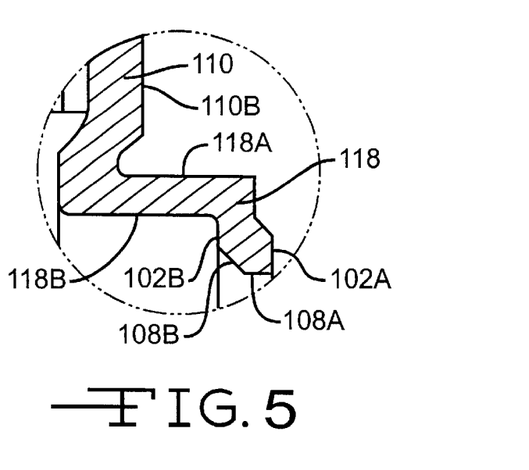
FIG. 5 is an enlarged sectional view of a portion of the rotor illustrated in FIG. 4.
Figure 7:
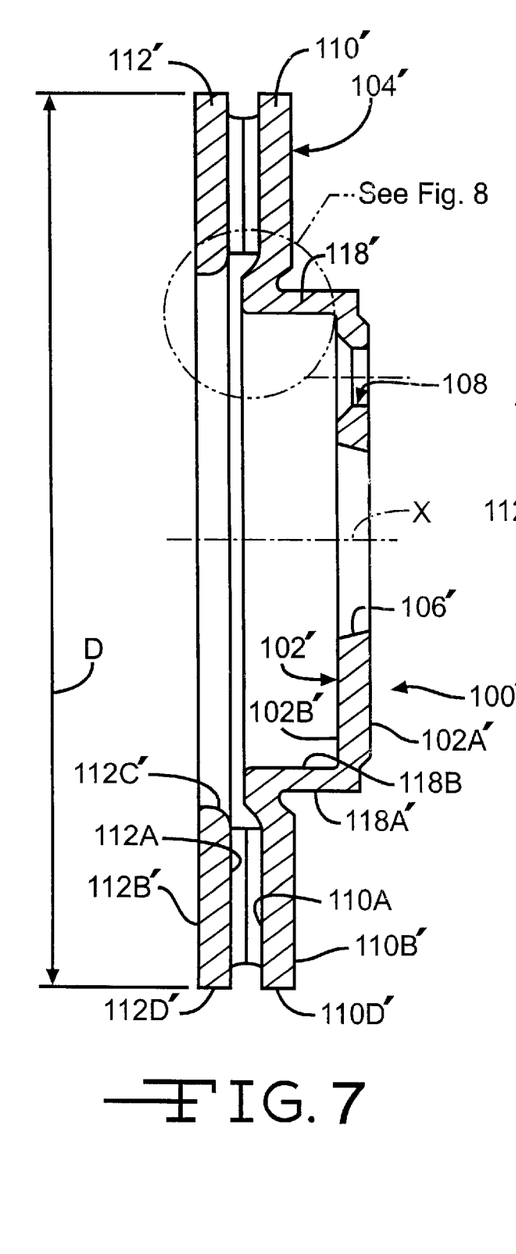
FIG. 7 is a sectional view of a finish machined rotor in accordance with the present invention.

Referring now to FIGS. 4 and 7, there is illustrated a brake rotor in accordance with the present invention and which can be used in place of the prior art brake rotor 52 of the prior art disc brake assembly 10 illustrated in FIGS. 1 through 3. The illustrated brake rotor is a "full cast" rotor and is formed as a one piece casting. As will be discussed below, FIG. 4 illustrates a near net shaped cast brake rotor, indicated generally at 100, having as cast lug bolt receiving holes 108, and FIG. 7 illustrates a finish machined brake rotor, indicated generally at 100'. Although the brake rotor 100 of this invention will be described and illustrated in conjunction with the particular prior art vehicle disc brake assembly 10 disclosed herein, it will be appreciated that it may be used in conjunction with other disc brake assembly structures. The brake rotor 100 can be formed from any suitable casting material, such as for example, grey iron, aluminum and alloys thereof.

As shown in FIG. 4, the near net shaped cast brake rotor 100 includes an inner mounting flange 102 and an outer annular friction disc 104. The inner mounting flange 102 and the outer friction disc portion 104 are preferably cast from gray iron as one piece by a near net shape casting process in accordance with the present invention. However, other materials, such as for example, iron, aluminum, or alloys thereof can also be used. The inner mounting flange 102 includes an outer surface 102A and an inner surface 102B.

Figure 6:
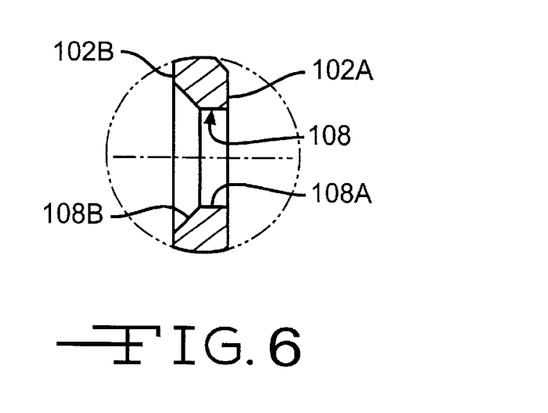
FIG. 6 is an enlarged sectional view of another portion of the rotor illustrated in FIG. 4.

The inner mounting flange 102 is formed having a relatively large rough formed center pilot hole 106 which is located generally concentrically about an axis of rotation X for the brake rotor 100. A plurality of smaller "as cast" lug bolt receiving holes 108 are also formed through the inner mounting flange 102. The lug bolt receiving holes 108 are equally spaced circumferentially about the pilot hole 106. As best shown in FIG. 6, the lug bolt receiving holes 108 include a first generally annular surface 108A and a second chamfered surface 108B. As will be discussed below, only an inner surface of the pilot hole 106 is subjected to a machining operation to produce a finished pilot hole. The as cast lug bolt receiving holes 108 do not require any additional machining to the inner surfaces thereof. A lug bolt (shown in prior art FIG. 1 at 60) extends through each of the lug bolt receiving holes 108 for securing the brake rotor 100 and a vehicle wheel (not shown) for rotation therewith to the vehicle via a hub (not shown) in a known manner.

The friction disc 104 includes a pair of annular friction plates 110 and 112 which are connected together in a spaced apart relationship by a plurality of fins or posts, indicated generally at 114 in FIG. 4. The posts 114 are preferably equally spaced circumferentially around the friction disc 104. Alternatively, the structure and/or the orientation of the fins 114 can be other than described if so desired. Also, while the brake rotor 100 is illustrated and described as being a "ventilated" type of brake rotor (i.e., includes the fins 114), the brake rotor 100 can be of other types, such as for example, a "solid" or "non-ventilated" brake rotor (i.e., does not include the fins 114). In the illustrated embodiment, the friction plate 110 is an outer friction plate and the friction plate 112 is an inner friction plate.

The outer friction plate 110 is connected by a circumferential wall or "hat" 118 to the inner mounting flange 102. The friction plate 110 includes an inner facing surface 110A, an outer facing surface 110B, and an outer peripheral edge 110D. Similarly, the friction plate 112 includes an inner facing surface 112A, an outer facing surface 112B, an inner peripheral edge 112C, and an outer peripheral edge 112D. The inner facing surfaces 110A and 112A and the outer facing surfaces 110B and 112B of the friction plates 110 and 112, respectively, are located in a generally parallel relationship relative to one another. The hat 118 includes an outer surface 118A and an inner surface 118B.

Figure 8:
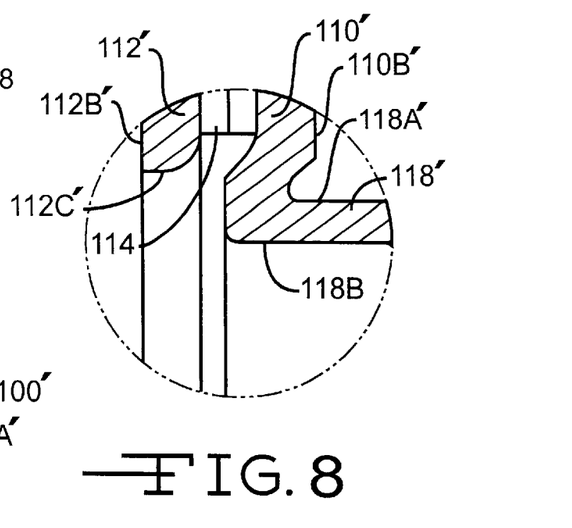
FIG. 8 is an enlarged sectional view of a portion of the rotor illustrated in FIG. 7.
Figure 11:
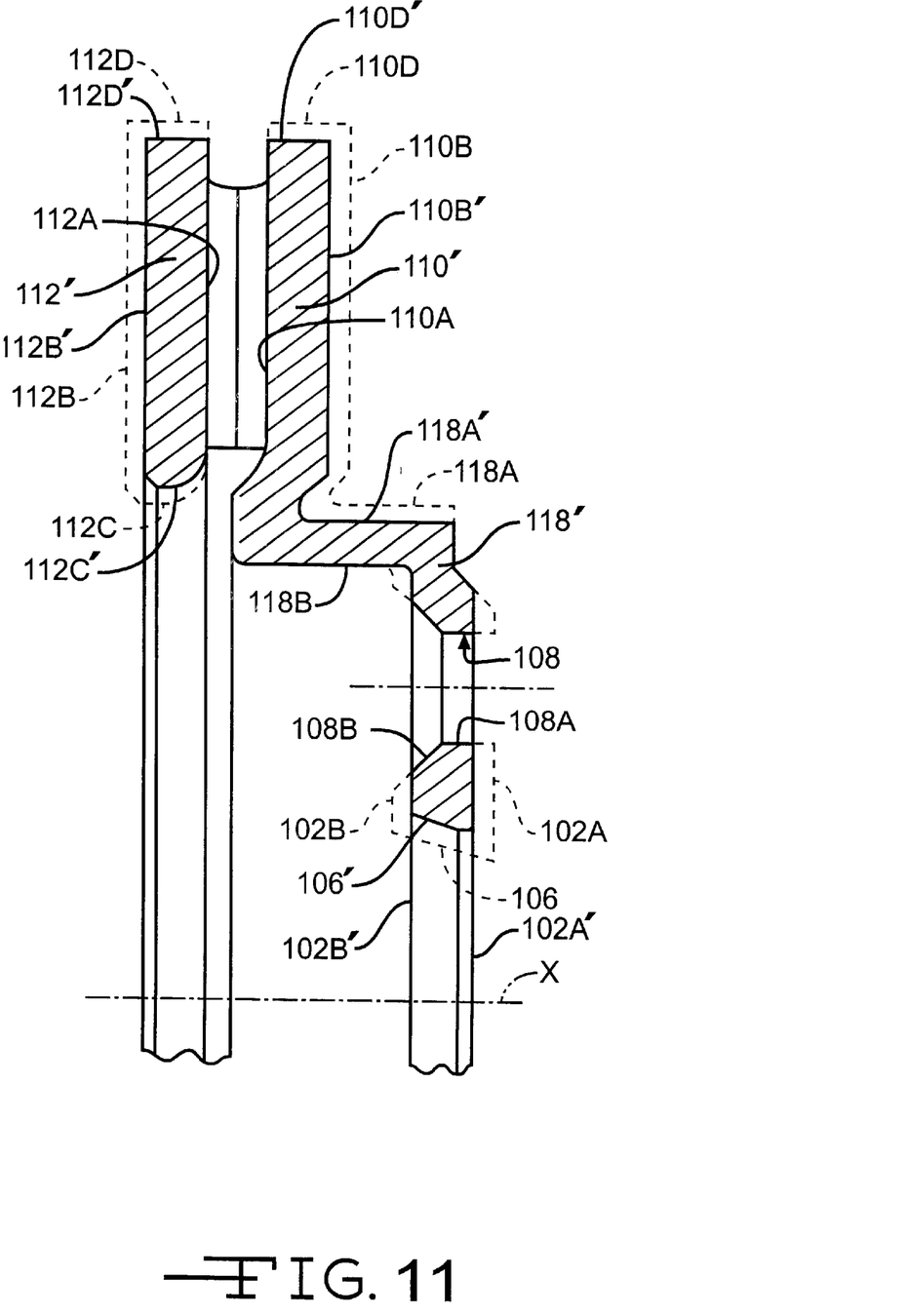
FIG. 11 is an enlarged view of a portion of the rotor illustrating the difference between the as cast rotor shown in FIG. 4 and the finish machined rotor shown in FIG. 7.

Referring now to FIGS. 7, 8 and 11 and using the same reference numbers to refer to like parts, there is illustrated a finish machined brake rotor 100' in accordance with the present invention. As shown in FIG. 7, the finish machined brake rotor 100' includes a finish machined inner mounting flange 102' and a finish machined outer annular friction disc 104'. The inner mounting flange 102' includes a finished turned center pilot hole 106', a finish machined outer surface 102A' and a finish machined inner surface 102B'.

The friction disc 104' includes a pair of annular finish machined friction plates 110' and 112'. The outer friction plate 110 is connected by a circumferential hat 118' to the inner mounting flange 102'. The friction plate 110' includes the as cast inner facing surface 110A, an outer finish machined facing surface 110B', and a finish machined outer peripheral edge 110D'. Similarly, the friction plate 112' includes the as cast inner facing surface 112A, an outer finish machined facing surface 112B', a finish machined inner peripheral edge 112C', and a finish machined outer peripheral edge 112D'. The outer facing surfaces 110B' and 112B' of the friction plates 110' and 112', respectively, are finish machined to be located in a generally parallel relationship relative to one another. The hat 118' includes a finish machined outer surface 118A'. The outer peripheral edges 110D' and 112D' of the friction plates 110' and 112', respectively, define an outer brake rotor diameter D relative to the axis of rotation X.

FIG. 11 illustrates the differences between the as cast rotor 100 and the finish machined rotor 100'. As shown therein, the finish machined rotor 100' is shown in solid lines and the as cast rotor 100 is shown in phantom lines. Thus, it can be readily seen that the finish machined brake rotor 100' includes the as cast lug bolt receiving holes 108. Thus, no finishing of the as cast lug bolt receiving holes 108 is needed. Also, while it is illustrated that the hat outer surface 118A and the inner friction plate 112 inner peripheral edge 112C are finish machined, these surfaces can be as cast surfaces if so desired as will be discussed below.

Figure 9:
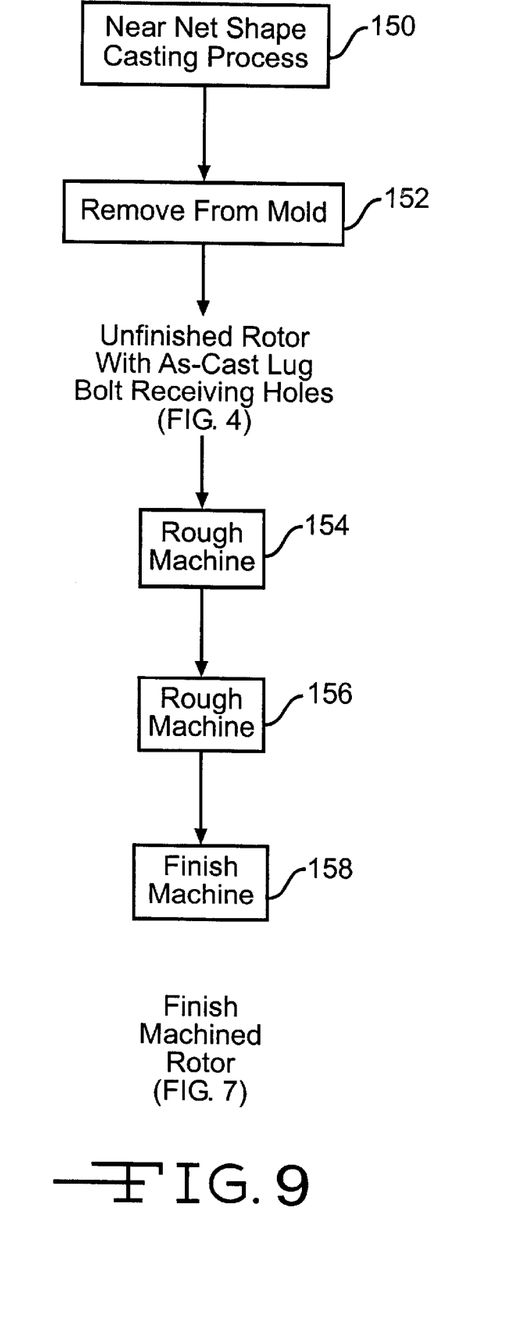
FIG. 9 is a block diagram showing a sequence of steps for producing the rotor illustrated in FIGS. 4 and 7 in accordance with the present invention.

Turning now to FIG. 9, the method for producing the brake rotor 100' of the present invention will be discussed. Initially, in step 150 a suitable material, such as cast iron, is introduced into a mold to form a brake rotor during a "near net" shape casting process. The term near net shape casting as used herein means that the brake rotor casting which is produced has a shape near that of the desired final shape of the finish machined cast part to reduce or minimize the machining that is required subsequent to the casting process.

Next, in step 152, the cast brake rotor 100 (shown in FIG. 4) is removed from the mold. As discussed above, the cast brake rotor 100 includes the as cast lug bolt receiving holes 108 formed therethrough. Next, the brake rotor 100 is rough machined in step 154. In particular, during step 154, the outer surface 118A' of the hat section, the outer surfaces 110B and 112B of the friction discs 110 and 112, respectively, the inner surface 102B and the outer surface 102A of the mounting flange 102 are rough machined and the center hub hole 106 is turned. Next, in step 156, the outer peripheral edges 110D and 112D of the friction plates 110 and 112, respectively, and the inner peripheral edge 112C of the friction plate 112 are rough machined. Alternatively, step 156 can be eliminated and the machining of step 156 can take place during step 154 if so desired. Following this, in step 158, the inner and outer surfaces of the mounting flange 102 and the outer surfaces of the friction plates 110 and 112 are finish machined to produce the finish machined rotor 100' in accordance with the present invention.

One advantage of the present invention is that the as cast lug bolt receiving holes 108 which are produced during step 150 are effective to reduce the mass of the rotor casting which is produced. Also, the as cast lug bolt receiving holes 108 of the present invention eliminates the need to form these holes subsequent to the casting process as required during the drilling step 80 in the manufacture of the prior art brake rotor 52. In addition, if step 156 is not performed separately but included in step 154, the near net shape casting process of step 150 of the present invention allows for the casting to be rough machined in a single operation thereby requiring only a single chucking operation. The prior art casting required two rough machining operations and therefore, two separate chucking operations. Thus, the present invention reduces the machine cycle time to machine the brake rotor and the costs associated therewith. In addition, the near net shape casting process of the present invention can produce a brake rotor casting 100 wherein no subsequent machining of the inner surface 118B and the outer surface 118A of the hat 188 and the inner peripheral edge 112C of the inner friction plate 112 is needed. These surfaces typically are only a clearance issue with respect to other wheel end components of the vehicle and do not have to be held to tight tolerances. Thus, the near net casting process of the present invention is operative to cast these surfaces to a tolerance which is sufficient to avoid interference with the other vehicle wheel end components.

While the brake rotor 100 and 100' of the present invention has been illustrated and described as being a full cast ventilated rotor, the invention may be used in connection with other types of rotors. For example, the invention may be used in connection with a non-ventilated rotor (not shown). Also, while the brake rotor 100 and 100' of the present invention has been illustrated and described in connection with a "sliding" caliper type of disc brake assembly, the invention may be used with other disc brake assemblies. For example, the invention may be used in connection with a "fixed" caliper type of disc brake assembly (not shown).

In accordance with the provisions of the patent statutes, the principle and mode of operation of this invention have been described and illustrated in its preferred embodiments. However, it must be understood that this invention may be practiced otherwise than as specifically explained and illustrated without departing from its spirit or scope.

What is claimed is:

1. A method for producing a brake rotor adapted for use in a vehicle brake system comprising the steps of:
    (a) providing a mold;
    (b) casting a brake rotor in the mold, the brake rotor including an inner mounting flange and an outer friction disc, the inner mounting flange having a plurality of as cast lug bolt receiving holes formed therethrough, the as cast lug bolt receiving holes not requiring any subsequent machining operation;
    (c) removing the brake rotor from the mold;
    (d) performing at least one rough machining operation on the brake rotor; and
    (e) performing at least one finish machining operation on the brake rotor to thereby produce a finish machined brake rotor.

2. The method according to claim 1 wherein in the step (b) the inner mounting flange includes an inner surface, an outer surface, and a center pilot hole formed therethrough, the outer friction disc includes an inner friction plate and an outer friction plate, the inner friction plate having an outer facing surface, an outer peripheral edge and an inner peripheral edge, the outer friction plate having an outer facing surface and an outer peripheral edge, the outer friction plate connected to the inner mounting flange by a hat, the hat having an outer facing surface and an inner facing surface, and during the step (d) at least one of the inner surface of inner mounting flange, the outer surface of the inner mounting flange, the outer facing surface of the inner friction plate, the outer peripheral edge of the inner friction plate, the inner peripheral edge of the inner friction plate, the outer facing surface of the outer friction plate, the outer peripheral edge of the outer friction plate, the outer facing surface of the hat, and the inner facing surface of the hat is rough machined.

3. The method according to claim 1 wherein in the step (b) the inner mounting flange includes an inner surface, an outer surface, and a center pilot hole formed therethrough, the outer friction disc includes an inner friction plate having an outer facing surface and an outer friction plate having an outer facing surface, one of the friction plates connected to the inner mounting flange by a hat and during the step (d) the inner and outer surfaces of the inner mounting flange and the outer facing surfaces of the friction plates are rough machined and the center pilot hole is turned.

4. The method according to claim 3 wherein in the step (e) the inner and outer surfaces of the inner mounting flange and the outer surfaces of the friction plates are finish machined.

5. The method according to claim 1 wherein the brake rotor is a ventilated brake rotor.

6. The method according to claim 1 wherein the brake rotor is a non-ventilated brake rotor.

7. The method according to claim 1 wherein the brake rotor is formed from grey iron.

8. The method according to claim 1 wherein the brake rotor is formed from aluminum.

9. A brake rotor produced according to the method of claim 1.

10. A brake rotor adapted for use in a vehicle brake system comprising:
    a brake rotor formed by a casting process including an inner mounting flange and an outer friction disc, said inner mounting flange including an inner surface and an outer surface, said outer friction disc including an inner friction plate and an outer friction plate, said inner friction plate having an outer facing surface, an outer peripheral edge and an inner peripheral edge, said outer friction plate having an outer facing surface and an outer peripheral edge, said outer friction plate connected to said inner mounting flange by a hat, said hat having an outer facing surface and an inner facing surface, wherein said inner mounting flange includes a plurality of as cast lug bolt receiving holes formed therethrough which are formed during the casting process and which do not require any subsequent machining operation.

11. The brake rotor according to claim 10 wherein said brake rotor is a ventilated brake rotor.

12. The brake rotor according to claim 10 wherein said brake rotor is a non-ventilated brake rotor.

13. The brake rotor according to claim 10 wherein said brake rotor is formed from grey iron.

14. The brake rotor according to claim 10 wherein said brake rotor is formed from aluminum.

15. The brake rotor according to claim 10 wherein said inner mounting flange includes a center pilot hole formed therethrough.

16. A brake rotor adapted for use in a vehicle brake system comprising:
    a brake rotor formed by a casting process including an inner mounting flange and an outer friction disc, said inner mounting flange including a plurality of as cast lug bolt receiving holes formed therethrough which are formed during the casting process and which do not require any subsequent machining operation.

17. The brake rotor according to claim 16 wherein said brake rotor is a ventilated brake rotor.

18. The brake rotor according to claim 16 wherein said brake rotor is a non-ventilated brake rotor.

19. The brake rotor according to claim 16 wherein said brake rotor is formed from grey iron.

20. The brake rotor according to claim 16 wherein said brake rotor is formed from aluminum.

21. The brake rotor according to claim 16 wherein said outer friction disc includes an inner friction plate and an outer friction plate, said inner friction plate having an outer facing surface, an outer peripheral edge and an inner peripheral edge, said outer friction plate having an outer facing surface and an outer peripheral edge, said outer friction plate connected to said inner mounting flange by a hat.

* * * * *